United States Patent
Wang et al.

(10) Patent No.: US 11,201,705 B2
(45) Date of Patent: Dec. 14, 2021

(54) DATA MODULATION AND DEMODULATION METHOD AND APPARATUS

(71) Applicant: HUAWEI TECHNOLOGIES CO., LTD., Shenzhen (CN)

(72) Inventors: Lei Wang, Shanghai (CN); Lei Zhang, Shanghai (CN); Yiqun Wu, Shanghai (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/990,333

(22) Filed: Aug. 11, 2020

(65) Prior Publication Data
US 2020/0374059 A1 Nov. 26, 2020

Related U.S. Application Data

(63) Continuation of application No. PCT/CN2019/074267, filed on Jan. 31, 2019.

(30) Foreign Application Priority Data

Feb. 12, 2018 (CN) .......................... 201810147021.4

(51) Int. Cl.
*H04K 1/10* (2006.01)
*H04L 27/28* (2006.01)
*H04L 5/00* (2006.01)

(52) U.S. Cl.
CPC .......... *H04L 5/0016* (2013.01); *H04L 5/0044* (2013.01)

(58) Field of Classification Search
CPC ... H04L 5/0016; H04L 5/0044; H04L 69/324; H04L 5/0023; H04W 16/28
(Continued)

(56) References Cited

U.S. PATENT DOCUMENTS

2009/0252257 A1* 10/2009 Sadowsky ............. H04W 16/28
375/299
2013/0272263 A1* 10/2013 Pi ........................ H04L 5/0023
370/330
(Continued)

FOREIGN PATENT DOCUMENTS

CN 105610480 A 5/2016
CN 106160971 A 11/2016
(Continued)

OTHER PUBLICATIONS

Zte et al, "Receiver Algorithms of Linear-spreading based NOMA", 3GPP TSG RAN WG1 Meeting AH 1801, R1-1800123,R1-1800123, total 12 pages.

(Continued)

*Primary Examiner* — Phuong Phu
(74) *Attorney, Agent, or Firm* — Hauptman Ham, LLP

(57) ABSTRACT

A data modulation method includes dividing, by a terminal device, to-be-sent data into N bit groups, wherein N≥2 and N is an integer. The method also includes generating, by the terminal device, N complex symbol groups. An $i^{th}$ complex symbol group is obtained by processing an $i^{th}$ bit group based on a mapping rule corresponding to the $i^{th}$ bit group. The mapping rule corresponding to the $i^{th}$ bit group is determined based on at least a group identity of the $i^{th}$ bit group and a first parameter. The first parameter includes at least one of a pilot parameter, a hopping identity, a terminal device identity, a layer index of a non-orthogonal layer, or a hopping offset. The N bit groups correspond to at least two different mapping rules, $0 \le i \le N-1$, and i is an integer. The method further includes sending, by the terminal device, the N complex symbol groups.

20 Claims, 4 Drawing Sheets

Step 200: A terminal device divides to-be-sent data into N bit groups

Step 210: The terminal device generates N complex symbol groups

Step 220: The terminal device sends the N complex symbol groups

(58) Field of Classification Search
USPC ............... 375/260, 261, 264, 295, 299, 267
See application file for complete search history.

(56) References Cited

U.S. PATENT DOCUMENTS

| | | | |
|---|---|---|---|
| 2015/0071182 A1 | 3/2015 | Bayesteh et al. | |
| 2017/0289733 A1 | 10/2017 | Rajagopal et al. | |
| 2018/0183909 A1* | 6/2018 | Cariou | H04L 69/324 |

FOREIGN PATENT DOCUMENTS

| | | | |
|---|---|---|---|
| CN | 106374985 A | 2/2017 |
| CN | 107404371 A | 11/2017 |
| CN | 107465483 A | 12/2017 |
| CN | 107645370 A | 1/2018 |
| CN | 107409295 B | 4/2020 |
| WO | 2017198197 A1 | 11/2017 |
| WO | 2017204549 A1 | 11/2017 |
| WO | 2018210256 A1 | 11/2018 |

OTHER PUBLICATIONS

International Search Report issued in corresponding International Application No. PCT/CN/2019/074267, dated Apr. 19, 2019, pp. 1-9, State Intellectual Property Office of the P.R. China, Beijing, China.

Chinese Office Action issued in corresponding Chinese Application No. 201810147021.4, dated Jan. 2, 2020, pp. 1-5, State Intellectual Property Office of the P.R. China, Beijing, China.

Notice of Allowance issued in corresponding Chinese Application No. 201810147021.4, dated Apr. 24, 2020, pp. 1-4, State Intellectual Property Office of the P.R. China, Beijing, China.

European Search Report issued in corresponding European Application No. 19750482.2, dated Feb. 25, 2021, pp. 1-10, European Patent Office, Munich, Germany.

* cited by examiner

Step 200: A terminal device divides to-be-sent data into N bit groups

Step 210: The terminal device generates N complex symbol groups

Step 220: The terminal device sends the N complex symbol groups

//  DATA MODULATION AND DEMODULATION METHOD AND APPARATUS

CROSS-REFERENCE TO RELATED APPLICATIONS

This application is a continuation of International Application No. PCT/CN2019/074267, filed on Jan. 31, 2019, which claims priority to Chinese Patent Application No. 201810147021.4, filed on Feb. 12, 2018, The disclosures of the aforementioned applications are hereby incorporated by reference in their entireties.

TECHNICAL FIELD

This application relates to the field of wireless communications technologies, and in particular, to a data modulation and demodulation method and apparatus.

BACKGROUND 5G is a popular standard for a next-generation cellular communications network, and covers three scenarios: an enhanced mobile broadband (enhance mobile broadband, eMBB) scenario, an ultra-reliable low-latency communication (ultra reliable & low latency communication, uRLLC) scenario, and a massive machine type of communication (massive machine type of communication, mMTC) scenario. A high throughput is required in the eMBB scenario, high reliability and a low latency are required in the uRLLC scenario, and a massive quantity of connections are required in the mMTC scenario.

In the uRLLC scenario, because a relatively low transmission latency is required, a plurality of terminal devices are allowed to simultaneously perform transmission on a same resource. Herein, the same resource may be a same time domain resource, a same frequency domain resource, or a same code domain resource. Similarly, in the mMTC scenario, because a massive quantity of users need to be supported simultaneously, the plurality of terminal devices also need to be allowed to perform the transmission on the same resource. Such a manner in which a plurality of terminal devices share transmission on a same resource is referred to as non-orthogonal transmission.

Currently, there are many non-orthogonal transmission technologies, for example, a sparse code multiple access (sparse coded multiple access, SCMA) technology, a multi-user shared access (multi-user shared access, MUSA) technology, a pattern division multiple access (pattern division multiple access, PDMA) technology, an interleaved grid multiple access (interleave grid multiple access, IGMA) technology, and a resource extension multiple access (resource spread multiple access, RSMA) technology.

In a non-orthogonal transmission system, to enable a network device to distinguish between, on the same resource, signals sent by the plurality of terminal devices, the signals sent by different terminal devices are generated by using different mapping rules. However, due to limited mapping rules, especially in a scenario in which a plurality of terminal devices access a network, the plurality of terminal devices may generate signals by using a same mapping rule. Consequently, decoding and detection performance of the network device is degraded.

For example, in the SCMA technology, a codebook is used as a mapping rule to map data bits to a complex symbol group. Because limited mapping rules indicate limited codebooks, a collision occurs between the codebooks used by the terminal devices.

In the PDMA technology, a codebook is used as a mapping rule to map complex symbols to a complex symbol group. Because limited mapping rules indicate limited codebooks, a collision may occur between the codebooks used by the terminal devices.

In the MUSA technology, a spread spectrum sequence is used as a mapping rule. The spread spectrum sequence is selected from a spread spectrum sequence set for a complex symbol of each terminal device. Complex symbols after spreading are transmitted on a same time-frequency resource, to map the complex symbols to a complex symbol group. The network device separates the terminal devices from each other by using an effective interference cancellation method. Because a given spreading factor (spreading factor, SF) indicates limited spread spectrum sequences, when a relatively large quantity of terminal devices access the network, a collision occurs between the spread spectrum sequences used by the terminal devices.

In the IGMA technology, an interleaving pattern is used as a mapping rule. To-be-sent data may be obtained through bit-level interleaving processing. Complex symbols of the terminal devices are interleaving-processed, and the interleaving-processed complex symbols are transmitted on a same time-frequency resource, to map the complex symbols to a complex symbol group. IGMA is also a sparse spreading non-orthogonal transmission manner. Because a given SF also indicates limited available interleaving patterns, when a relatively large quantity of terminal devices access the network, a collision occurs between the interleaving patterns.

For non-orthogonal transmission, a relatively small spreading length indicates extremely limited mapping rules, and in particular, mapping rules that have good correlation and that can assist the network device in better demodulation are limited within a specific SF length. Therefore, in a multi-user access scenario, when there are a relatively large quantity of terminal devices, a collision and overlapping occur between the codebooks used by users, the sequences used by users, or the interleaving patterns used by users. Consequently, decoding and detection performance at a receive end is degraded. The foregoing different non-orthogonal multiple access (non-orthogonal multiple access, NOMA) technologies are all described by using a mapping rule of one bit group/complex symbol group as an example. Mapping rules of N bit groups/complex symbol groups also have the foregoing problem.

SUMMARY

Embodiments of this application provide a data modulation and demodulation method and apparatus, to resolve a prior-art problem that decoding and detection performance of a network device is degraded when a plurality of terminal devices generate signals by using a same mapping rule.

According to a first aspect, an embodiment of this application provides a data modulation method. The method includes: dividing, by a terminal device, to-be-sent data into N bit groups, where N≤2 and N is an integer; generating, by the terminal device, N complex symbol groups, where an $i^{th}$ complex symbol group is obtained by processing an $i^{th}$ bit group by using a mapping rule corresponding to the $i^{th}$ bit group, the mapping rule corresponding to the $i^{th}$ bit group is determined based on a group identity of the $i^{th}$ bit group and a first parameter, the first parameter includes at least one of a pilot parameter, a hopping identity, a terminal device identity, a layer index of a non-orthogonal layer, and a hopping offset, the N bit groups correspond to at least two different mapping rules, $0 \le i \le N-1$, and i is an integer; and sending, by the terminal device, the N complex symbol groups.

According to the foregoing method, the terminal device divides the to-be-sent data into the N bit groups, and then processes the bit groups by using the mapping rules corresponding to the bit groups, to generate the N complex symbol groups. The mapping rule corresponding to each bit group is determined based on the group identity of the bit group and the first parameter. Different terminal devices correspond to different first parameters. Therefore, a group of mapping rules used by the different terminal devices are not completely the same, thereby randomizing interference between the terminal devices, avoiding a decoding failure of the network device that occurs when the plurality of terminal devices generates signals by using a similar or same mapping rule, and improving a demodulation success rate of the network device.

In a possible design, the to-be-sent data is obtained by performing at least one of error correction coding, bit-level interleaving, or bit-level scrambling. The to-be-sent data may include one or more code blocks, or may be a part of one code block.

In a possible design, the mapping rule corresponding to the $i^{th}$ bit group is determined based on the group identity of the $i^{th}$ bit group, the first parameter, and a second parameter, and the second parameter includes at least one of a cell identity, a time domain resource sequence number, and a periodicity P.

According to the foregoing method, the mapping rule corresponding to each bit group may be determined by using a combination of a plurality of parameters.

In a possible design, when the terminal device retransmits the to-be-sent data, mapping rules corresponding to the N bit groups during each transmission are respectively the same as mapping rules corresponding to the N bit groups during initial transmission.

In a possible design, if the mapping rule corresponding to the $i^{th}$ bit group is the same as a mapping rule corresponding to a $j^{th}$ bit group, $i=j+nP$, where $P \ge 2$, $0 \le j < P$, $n \ge 0$, and j, n, and P are all integers; or $j=i \bmod P$, where $P \ge 2$, $0 \le j < P$, and both j and P are integers.

According to the foregoing method, the terminal device may process the N bit groups by using a relatively small quantity of mapping rules, to obtain the N complex symbol groups.

In a possible design, the terminal device identity is a radio network temporary identity RNTI, a radio resource control RRC identity, or a temporary mobile subscriber identity TMSI.

In a possible design, the terminal device performs scrambling processing on the N complex symbol groups before sending the N complex symbol groups, where a scrambling sequence used during the scrambling processing is determined based on at least one of the first parameter, the time domain resource sequence number, and the cell identity.

In this case, the sending, by the terminal device, the N complex symbol groups is specifically sending, by the terminal device, a signal obtained after the N complex symbol groups are scrambling-processed.

According to the foregoing method, different terminal devices perform scrambling processing on the complex symbol groups by using different scrambling sequences.

In a possible design, the terminal device performs interleaving processing on the N complex symbol groups before sending the N complex symbol groups, where an interleaving pattern used during the interleaving processing is determined based on at least one of the first parameter, the time domain resource sequence number, and the cell identity.

In this case, the sending, by the terminal device, the N complex symbol groups is specifically sending, by the terminal device, a signal obtained after the N complex symbol groups are interleaving-processed.

According to the foregoing method, different terminal devices perform interleaving processing on the complex symbol groups by using different interleaving patterns.

According to a second aspect, an embodiment of this application provides a data demodulation method. The method includes: receiving, by a network device, an uplink signal; determining, by the network device, a mapping rule corresponding to each of N complex symbol groups in the uplink signal, where $N \ge 2$ and N is an integer; and demodulating, by the network device, a corresponding complex symbol group by using the mapping rule corresponding to each of the N complex symbol groups, where a mapping rule corresponding to an $i^{th}$ complex symbol group is determined based on a group identity of the $i^{th}$ complex symbol group and a first parameter, the first parameter includes at least one of a pilot parameter, a hopping identity, a terminal device identity, a layer index of a non-orthogonal layer, and a hopping offset, the N complex symbol groups correspond to at least two different mapping rules, $0 \le i \le N-1$, and i is an integer.

According to the foregoing method, the mapping rule corresponding to each bit group is determined based on the group identity of the bit group and the first parameter. Different terminal devices correspond to different first parameters. Therefore, a group of mapping rules used by the different terminal devices are not completely the same, thereby randomizing interference between the terminal devices, avoiding a decoding failure of the network device that occurs when the plurality of terminal devices generates signals by using a similar or same mapping rule, and improving a demodulation success rate of the network device.

In a possible design, the mapping rule corresponding to the $i^{th}$ complex symbol group is determined based on the group identity of the $i^{th}$ complex symbol group, the first parameter, and a second parameter, and the second parameter includes at least one of a cell identity, a time domain resource sequence number, and a periodicity P.

According to the foregoing method, the mapping rule corresponding to each bit group may be determined by using a combination of a plurality of parameters.

In a possible design, the network device determines that mapping rules corresponding to the N complex symbol groups during non-initial transmission are respectively the same as mapping rules corresponding to the N complex symbol groups during initial transmission.

In a possible design, the terminal device identity is a radio network temporary identity RNTI, a radio resource control RRC identity, or a temporary mobile subscriber identity TMSI.

In a possible design, the network device may specifically determine the mapping rule corresponding to each of the N complex symbol groups in the uplink signal by using but not limited to the following method:

determining, by the network device based on a pilot in the uplink signal, a pilot parameter corresponding to the pilot; and determining, by the network device based on the pilot parameter and a group identity of each of the N complex symbol groups, the mapping rule corresponding to each of the N complex symbol groups.

In a possible design, the network device may specifically determine the mapping rule corresponding to each of the N complex symbol groups in the uplink signal by using but not limited to the following method:

determining, by the network device, the hopping identity based on a pilot in the uplink signal; and determining, by the network device based on the hopping identity and a group identity of each of the N complex symbol groups, the mapping rule corresponding to each of the N complex symbol groups.

In a possible design, the network device may specifically determine the mapping rule corresponding to each of the N complex symbol groups in the uplink signal by using but not limited to the following method:

determining, by the network device, the terminal device identity based on a pilot in the uplink signal; and determining, by the network device based on the terminal device identity and a group identity of each of the N complex symbol groups, the mapping rule corresponding to each of the N complex symbol groups.

Therefore, the network device determines the mapping rule corresponding to each of the N complex symbol groups, based on an association relationship between the pilot in the uplink signal and the pilot parameter, an association relationship between the pilot in the uplink signal and the hopping identity, or an association relationship between the pilot in the uplink signal and the terminal device identity.

In a possible design, the network device may specifically determine the mapping rule corresponding to each of the N complex symbol groups in the uplink signal by using but not limited to the following method:

determining, by the network device, layer indexes of M non-orthogonal layers, where M is a positive integer; determining, by the network device, at least one of the N complex symbol groups that corresponds to each of the M non-orthogonal layers, where an $m^{th}$ non-orthogonal layer corresponds to $s_m$ complex symbol groups, $$\sum_{1}^{M} s_m = N,$$

the $m^{th}$ non-orthogonal layer is any one of the M non-orthogonal layers, m≤M, and m is a positive integer; and determining, by the network device based on the layer indexes of the M non-orthogonal layers and a group identity of each of the N complex symbol groups, the mapping rule corresponding to each of the N complex symbol groups, where a mapping rule that corresponds to each of the $s_m$ complex symbol groups corresponding to the $m^{th}$ non-orthogonal layer is determined by the network device based on a layer index of the $m^{th}$ non-orthogonal layer and a group identity that corresponds to each of the $s_m$ complex symbol groups corresponding to the $m^{th}$ non-orthogonal layer.

It should be understood that the determining, by the network device, layer indexes of M non-orthogonal layers is determining, by the network device, a layer index of a non-orthogonal layer corresponding to the terminal device that sends the uplink signal. The network device determines, by using a same method, a layer index of a non-orthogonal layer corresponding to each terminal device that sends the uplink signal. Specifically, the network device may determine the layer indexes of the M non-orthogonal layers in the following two manners.

Manner 1: The network device may determine the layer indexes of the M non-orthogonal layers based on a pilot in the uplink signal. When the uplink signal includes a plurality of pilots, the network device may determine a corresponding layer index of at least one non-orthogonal layer based on each pilot. The network device pre-stores the layer index of the at least one non-orthogonal layer corresponding to each pilot.

Manner 2: The network device schedules at least one terminal device to send the uplink signal. After receiving the uplink signal, the network device learns about one or more terminal devices that send the uplink signal, and then determines the layer index of the at least one non-orthogonal layer corresponding to each terminal device. The network device pre-stores the layer index of the at least one non-orthogonal layer corresponding to each terminal device.

In a possible design, before demodulating the N complex symbol groups by using the mapping rule corresponding to each of the N complex symbol groups, the network device performs descrambling processing on scrambling-processed N complex symbol groups in the uplink signal, to obtain the N complex symbol groups, where a scrambling sequence used during the descrambling processing is determined based on at least one of the first parameter, the time domain resource sequence number, and the cell identity.

In a possible design, the network device may specifically determine the mapping rule corresponding to each of the N complex symbol groups in the uplink signal by using but not limited to the following method: determining, by the network device, the hopping offset based on a pilot in the uplink signal; and determining, by the network device based on the hopping offset and a group identity of each of the N complex symbol groups, the mapping rule corresponding to each of the N complex symbol groups.

It is assumed that there are a total of Q mapping rules predefined in a system, and the mapping rule corresponding to the $i^{th}$ bit group is a $q^{th}$ mapping rule (0≤i≤N−1, 0≤q≤Q−1). In this case, the q mapping rule may be determined by using any one of the following formulas:

$q=$(Hopping initial value+$i$*Hopping offset)mod $Q$     Formula 1:

$q=(i$*Hopping offset)mod $Q$     Formula 2:

$q=$(Hopping initial value+$i'$*Hopping offset)mod $Q$, where     Formula 3:

i'=i mod Q', and Q' is an integer greater than 1.

The network device may configure the hopping offset and the hopping initial value for the terminal device by using an RRC message or DCI. In addition, the hopping initial value may alternatively be determined by the terminal device. In a possible design, the hopping initial value may be determined based on one or more of the time domain resource sequence number, the cell identity, the pilot parameter, a non-orthogonal layer index, and the terminal device identity.

In a possible design, before the demodulating, by the network device, the N complex symbol groups by using the mapping rule corresponding to each of the N complex symbol groups, the method further includes:

performing, by the network device, deinterleaving processing on interleaving-processed N complex symbol groups in the uplink signal, to obtain the N complex symbol groups, where an interleaving pattern used during the deinterleaving processing is determined based on at least one of the first parameter, the time domain resource sequence number, and the cell identity.

According to a third aspect, this application provides a data modulation apparatus to perform the method according to any one of the first aspect or the possible designs of the first aspect. Specifically, the apparatus includes units configured to perform the method according to any one of the first aspect or the possible designs of the first aspect.

According to a fourth aspect, this application provides a data demodulation apparatus to perform the method according to any one of the second aspect or the possible designs of the second aspect. Specifically, the apparatus includes units configured to perform the method according to any one of the second aspect or the possible designs of the second aspect.

According to a fifth aspect, this application provides a terminal device. The terminal device includes a transceiver, a processor, and a memory. The memory is configured to store a computer program. The processor invokes the computer program stored in the memory. The transceiver performs the method according to any one of the first aspect or the possible designs of the first aspect.

According to a sixth aspect, this application provides a network device. The network device includes a transceiver, a processor, and a memory. The memory is configured to store a computer program. The processor invokes the computer program stored in the memory. The transceiver performs the method according to any one of the first aspect or the possible designs of the first aspect.

For specific execution steps, refer to the first aspect and the second aspect. Details are not described herein again.

According to a seventh aspect, this application further provides a computer-readable storage medium. The computer-readable storage medium stores a computer program, and when the computer program is run on a computer, the computer is enabled to perform the methods according to the foregoing aspects.

According to an eighth aspect, this application further provides a computer program product including a program. When the program is run on a computer, the computer is enabled to perform the methods according to the foregoing aspects.

DESCRIPTION OF EMBODIMENTS

The following describes embodiments of this application with reference to accompanying drawings.

A network device in the embodiments of this application is an access device that is connected to a mobile communications system by a terminal device in a wireless manner, and may be a base station, an evolved NodeB (eNodeB), a base station in a 5G mobile communications system, a next-generation mobile communications NodeB (next generation Node B, gNB), a base station in a future mobile communications system, an access node in a Wi-Fi system, or the like. A specific technology and a specific device form used by the network device are not limited in the embodiments of this application.

The terminal device (terminal equipment) in the embodiments of this application may also be referred to as a terminal, user equipment (user equipment, UE), a mobile station (mobile station, MS), a mobile terminal (mobile terminal, MT), or the like. The terminal device may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self-driving), a wireless terminal in a remote surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

Figures 1, 2:
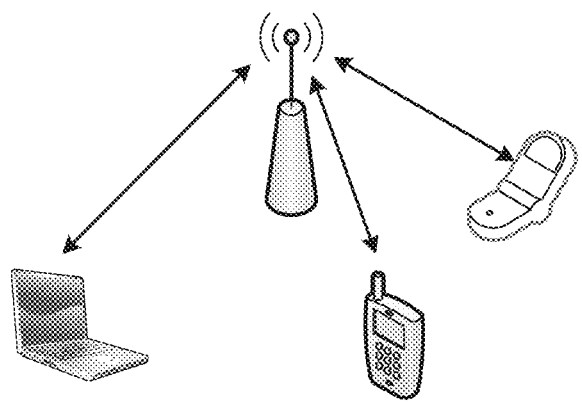
FIG. 1 is a schematic diagram of a non-orthogonal transmission scenario according to an embodiment of this application.
FIG. 2 is an overview flowchart of a data modulation method according to an embodiment of this application.

FIG. 1 is a schematic diagram of a non-orthogonal transmission scenario. In an existing non-orthogonal transmission system, due to limited mapping rules, different terminal devices may generate signals by using a similar or same mapping rule, and there is relatively strong interference between the signals generated by using the similar or same mapping rule. Consequently, the network device is prone to a demodulation failure.

It should be understood that the embodiments of this application are mainly applied to the non-orthogonal transmission scenario, to optimize a data modulation method used by the terminal device, thereby improving a demodulation success rate of the network device.

Referring to FIG. 2, an embodiment of this application provides a data modulation method. For a transmit end, the method includes the following steps.

Step 200: A terminal device divides to-be-sent data into N bit groups.

N≥2 and N is an integer.

For example, the to-be-sent data includes m*N bits. It is assumed that each bit group includes m bits. In this case, the terminal device groups the m*N bits into the N bit groups.

In a possible design, the to-be-sent data is obtained by performing at least one of error correction coding, bit-level interleaving, or bit-level scrambling. The to-be-sent data may include one or more code blocks, or may be a part of one code block.

In a possible design, the network device configures, for the terminal device, a quantity of bits included in each bit group and a total quantity of bits of the to-be-sent data during each transmission. Each bit group may include different quantities of bits. In another possible design, the quantity of bits included in the bit group may be preset, for example, specified in a standard.

For example, if the network device configures a total quantity X of bits of data to be sent by a terminal device A, a quantity Y1 of bits included in each of the first N1 bit groups, and a quantity Y2 of bits included in each of the last (N−N1) bit groups, N1*Y1+(N−N1)*Y2=X, where Y1≠Y2, and X, N1, Y1, and Y2 are all positive integers.

Step 210: The terminal device generates N complex symbol groups.

An $i^{th}$ complex symbol group is obtained by processing an $i^{th}$ bit group by using a mapping rule corresponding to the $i^{th}$ bit group, the mapping rule corresponding to the $i^{th}$ bit group is determined based on a group identity of the $i^{th}$ bit group and a first parameter, the first parameter includes at least one of a pilot parameter, a hopping identity, a terminal device identity, a layer index of a non-orthogonal layer, and a hopping offset, 0≤i≤N−1, and i is an integer.

The mapping rule is a rule of mapping a bit group to a complex symbol group. Each bit includes two values: 0 and 1. It is assumed that each bit group includes m bits. In this case, the m bits have a total of 2m value combinations, and each value combination corresponds to L complex symbols.

In a possible design, a specific implementation form of the mapping rule may be a combination of a preset table and a spread spectrum code-sequence. The table specifies a correspondence between the 2m value combinations and 2m complex symbols, where one value combination corresponds to one complex symbol. In a process of mapping bits of the to-be-sent data to a complex symbol, the m bits included in each bit group may be mapped to one complex symbol based on the table, and then the complex symbol is multiplied by a spread spectrum code-sequence whose length is L, to obtain L complex symbols. In this design, different mapping rules may mean that preset tables are different, or may mean that spread spectrum code-sequences are different, or may mean that both preset tables and spreading code are different. The mapping rule in this design may be applied to MUSA.

In a possible design, a specific implementation form of the mapping rule may alternatively be merely a preset table. The table specifies a correspondence between the 2m value combinations and 2m complex symbol groups, where one value combination corresponds to one complex symbol group, and each complex symbol group includes L complex symbols. In a process of mapping bits of the to-be-sent data to a complex symbol, the m bits included in each bit group may directly be mapped, based on the table, to one complex symbol group including L complex symbols. Optionally, the L complex symbols may include a plurality of zeros. The mapping rule in this design may be applied to SCMA.

In a possible design, a specific implementation form of the mapping rule may be two preset tables. A table 1 specifies a correspondence between the 2m value combinations and 2m complex symbols, where one value combination corresponds to one complex symbol. A table 2 specifies a correspondence between the 2m complex symbols and 2m complex symbol groups, where one complex symbol corresponds to one complex symbol group, and each complex symbol group includes L complex symbols. In a process of mapping bits of the to-be-sent data to a complex symbol, the m bits included in each bit group may be mapped to one complex symbol based on the table 1, and then the complex symbols are mapped to one complex symbol group based on the table 2. In this design, different mapping rules may mean that tables 1 are different, or may mean that tables 2 are different, or may mean that both tables 1 and tables 2 are different. The mapping rule in this design may be applied to PDMA.

In a possible design, a specific implementation form of the mapping rule may be a combination of a preset table and an interleaving pattern. The table specifies a correspondence between the 2m value combinations and 2m complex symbols, where one value combination corresponds to one complex symbol. In a process of mapping bits of the to-be-sent data to a complex symbol, the m bits included in each bit group may be mapped to one complex symbol based on the table, and then interleaving processing is performed on the complex symbol based on the interleaving pattern, to obtain one complex symbol group including L complex symbols. In this design, different mapping rules may mean that tables are different, or may mean that interleaving patterns are different, or may mean that both tables and interleaving patterns are different. The mapping rule in this design may be applied to IGMA.

It should be noted that the table mentioned in the foregoing embodiment is only a specific form for implementing a correspondence between a bit (group) and a complex symbol (group). It may be understood that the correspondence between a bit (group) and a complex symbol (group) may alternatively be implemented in another form. This is not limited in this application.

Among the four first parameters, the pilot parameter is configured by the network device for the terminal device, or the pilot parameter is selected by the terminal device from a pilot parameter set. The pilot parameter may be used to generate a demodulation reference signal (demodulation reference signal, DMRS), or may be used to generate a random access preamble (preamble). The pilot parameter is at least one of parameters such as an antenna port number corresponding to a pilot, a parameter used to generate a pilot sequence, or a time-frequency resource position occupied by a pilot.

The hopping identity is configured by the network device for the terminal device. Different terminal devices have different hopping identities. There is a correspondence between the pilot parameter configured by the network device for the terminal device and the hopping identity configured by the network device for the terminal device. Specifically, the network device may notify the terminal device of the hopping identity by using a radio resource control (radio resource control, RRC) message or downlink control information (downlink control information, DCI).

The terminal device identity is a radio network temporary identity (radio network temporary identity, RNTI), an RRC identify, or a temporary mobile subscriber identity (temporary mobile subscriber identify, TMSI). There is a correspondence between the pilot parameter configured by the network device for the terminal device and the terminal device identity.

Each non-orthogonal layer corresponds to a layer index (layer index) of the non-orthogonal layer. The terminal device may transmit the to-be-sent data by using a plurality of non-orthogonal layers. When the first parameter includes the layer index of the non-orthogonal layer, the mapping rule corresponding to the $i^{th}$ bit group is determined based on the group identity of the $i^{th}$ bit group and the layer index of the non-orthogonal layer used to transmit the $i^{th}$ bit group.

For example, in an SCMA technology, to-be-sent data of each terminal device may be transmitted by using a plurality of SCMA-layers. For example, there are two SCMA-layers, and the terminal device divides the to-be-sent data into four bit groups. If a first bit group and a second bit group are transmitted by using an SCMA-layer 1, a mapping rule corresponding to the first bit group is determined based on a group identity of the first bit group and a layer index of the SCMA-layer 1, and a mapping rule corresponding to the second bit group is determined based on a group identity of the second bit group and the layer index of the SCMA-layer 1. If a third bit group and a fourth bit group are transmitted by using an SCMA-layer 2, a mapping rule corresponding to the third bit group is determined based on a group identity of the third bit group and a layer index of the SCMA-layer 2, and a mapping rule corresponding to the fourth bit group is determined based on a group identity of the fourth bit group and the layer index of the SCMA-layer 2.

The mapping rule corresponding to the $i^{th}$ bit group may be determined based on the group identity of the $i^{th}$ bit group and a hopping offset. It is assumed that there are a total of Q mapping rules predefined in a system, and the mapping rule corresponding to the $i^{th}$ bit group is a $q^{th}$ mapping rule ($0 \leq i \leq N-1$, $0 \leq q \leq Q-1$). In this case, the $q^{th}$ mapping rule may be determined by using any one of the following formulas:

$q=$(Hopping initial value+$i$*Hopping offset)mod $Q$    Formula 1:

$q=(i$*Hopping offset)mod $Q$    Formula 2:

$q=$(Hopping initial value+$i'$*Hopping offset)mod $Q$, where    Formula 3:

i'=i mod Q', and Q is an integer greater than 1.

The network device may configure the hopping offset and the hopping initial value for the terminal device by using the RRC or the DCI.

If the $q^{th}$ mapping rule is determined according to Formula 1, the network device may configure different hopping initial values for the different terminal devices, and configure a same hopping offset for the different terminal devices; or the network device may configure a same hopping initial value for the different terminal devices, and configure different hopping offsets for the different terminal devices; or the network device may configure different hopping initial values for the different terminal devices, and configure different hopping offsets for the different terminal devices.

If the $q^{th}$ mapping rule is determined according to Formula 2, the network device needs to configure different hopping offsets for the different terminal devices.

In addition, the hopping initial value may alternatively be determined by the terminal device. In a possible design, the hopping initial value may be determined based on one or more of a time domain resource sequence number, a cell identity, the pilot parameter, a non-orthogonal layer index, and the terminal device identity. It should be understood that a parameter used to calculate the hopping initial value may be preset. For example, the hopping initial value is specified in the standard, or is configured by the network device for the terminal device.

In addition, in a possible design, the network device may further configure an indication parameter for the terminal device. The indication parameter is used to indicate whether the terminal device uses the data modulation method shown in FIG. 2. It is assumed that the indication parameter is a hopping enable identifier. The network device may configure the indication parameter for the terminal device by using the RRC message or the DCI. In addition, corresponding indication parameters need to be separately configured for a grant-based (grant-based) transmission mode and a grant-free transmission (grant-free transmission/transmission without grant) mode, or corresponding indication parameters may be independently configured for different logical channels.

It should be understood that parameters such as the hopping identity in the first parameter, a periodicity P in a second parameter may be configured by the network device for the terminal device by using the RRC message and/or the DCI, and parameters such as the pilot parameter and the terminal device identity in the first parameter and a cell identity and a time domain resource sequence number in the second parameter may be configured by reusing an existing configuration solution in the prior art.

Because the mapping rule corresponding to each bit group is determined based on at least a group identity of the bit group and the first parameter, and different bit groups have different group identities, the N bit groups correspond to at least two different mapping rules.

In a possible design, the mapping rule corresponding to the $i^{th}$ bit group is determined based on the group identity of the $i^{th}$ bit group, the first parameter, and the second parameter, and the second parameter includes at least one of the cell identity, the time domain resource sequence number, and the periodicity P.

Among the three types of second parameters, the time domain resource sequence number may be a subframe number, a slot number, or the like.

The periodicity P meets Formula 1: i=j+nP, where P≥2, 0≤j<P, n≥0, and j, n, and P are all integers.

Alternatively, the periodicity P meets Formula 2: j=i mod P, where P≥2, 0≤j<P, and both j and P are integers.

If i and j meet the foregoing formulas, the mapping rule corresponding to the $i^{th}$ bit group is the same as a mapping rule corresponding to a $j^{th}$ bit group.

For example, if N=6, P=3, and it is assumed that a mapping rule corresponding to a $0^{th}$ bit group is A, a mapping rule corresponding to a first bit group is B, and a mapping rule corresponding to a second bit group is C, a mapping rule corresponding to a third bit group is A, a mapping rule corresponding to a fourth bit group is B, and a mapping rule corresponding to a fifth bit group is C. To be specific, starting from the $0^{th}$ bit group, every three bit groups form one group, and three mapping rules are cyclically used in sequence.

In addition, in a possible design, when the terminal device needs to retransmit the to-be-sent data, mapping rules corresponding to the N bit groups during each transmission are respectively the same as mapping rules corresponding to the N bit groups during initial transmission.

Specifically, in an optional embodiment, a time domain resource sequence number used to determine the mapping rules corresponding to the N bit groups during $k^{th}$ transmission of the to-be-sent data is the same as a time domain resource sequence number used to determine the mapping rules corresponding to the N bit groups during the initial transmission of the to-be-sent data, where k=1, ..., K, and K is a maximum quantity of times of retransmission.

In an optional embodiment, when the parameters used to determine the mapping rules corresponding to the N bit groups do not include the time domain resource sequence number, the mapping rules corresponding to the N bit groups during the $k^{th}$ transmission are respectively the same as the mapping rules corresponding to the N bit groups during the initial transmission.

Step 220: The terminal device sends the N complex symbol groups.

Before sending the N complex symbol groups, the terminal device may further choose to perform scrambling processing or interleaving processing on the N complex symbol groups.

In a possible design, the terminal device performs the scrambling processing on the N complex symbol groups, and sends a signal obtained after the N complex symbol groups are scrambling-processed.

A scrambling sequence used during the scrambling processing is determined based on at least one of the first parameter, the time domain resource sequence number, and the cell identity.

It should be understood that the performing, by the terminal device, the scrambling processing on the N complex symbol groups is performing, by the terminal device by using a scrambling sequence, the scrambling processing on a sequence including the N complex symbol groups.

Specifically, the scrambling sequence may be generated by using a pseudo-random sequence generator. An initial value needs to be input into the pseudo-random sequence generator, to generate the scrambling sequence. The initial value is determined based on at least one of the first parameter, the cell identity, and the time domain resource sequence number.

For example, if c_init is the initial value, c_init=Terminal device identity$*2^A$+Time domain resource sequence number$*2^B$+Cell identity, where A and B are preset positive integers. A pseudo-random binary sequence c(s) may be generated by inputting c_init into a pseudo-random binary sequence generator, where s=0, . . . , 2S−1, S is a sequence length, and c(s) is generated based on c_init.

For example, c(s)=1/sqrt(2)*(1−2*c(2s))+j*1/sqrt(2)*(1−2*c(2s+1)), where s=0, . . . , S−1, S is the sequence length, j=sqrt(−1), and sqrt( ) indicates extraction of square root.

It should be understood that, scrambling processing in the prior art is performed on a bitstream, but the scrambling processing in the embodiments of this application is performed on a complex symbol stream.

In a possible design, the terminal device performs the interleaving processing on the N complex symbol groups, and sends a signal obtained after the N complex symbol groups are interleaving-processed.

The interleaving pattern used during the interleaving processing is determined based on at least one of the first parameter, the time domain resource sequence number, and the cell identity.

It should be understood that the interleaving processing refers to reorder the N complex symbol groups, and the interleaving pattern is a reordering rule.

For example, when the interleaving processing is matrix interleaving, the interleaving pattern is determined based on a quantity of rows for matrix interleaving, where Quantity of rows for matrix interleaving=g(Cell identity, Time domain resource sequence number, Terminal device identity), and g is a preset function.

Similarly, interleaving processing in the prior art is performed on a bitstream, but the interleaving processing in the embodiments of this application is performed on a complex symbol stream.

In prior art, in a non-orthogonal transmission system, to enable the network device to distinguish between, on a same resource, signals respectively corresponding to a plurality of terminal devices, signals sent by the different terminal devices need to have different signal signatures. For example, the signals sent by the different terminal devices are generated by using different mapping rules, or the signals sent by the different terminal devices are scrambling-processed by using different scrambling sequences, or the signals sent by the different terminal devices are interleaving-processed by using different interleaving patterns. Therefore, the signals sent by the different terminal devices have different signatures (signature), and the different signatures may be different mapping manners, and/or different interleaving manners, and/or different scrambling manners, and/or the like.

It should be understood that the N complex symbol groups on which the scrambling processing is performed are not limited to the N complex symbol groups obtained by using the embodiment shown in FIG. 1, and may alternatively be applied to a complex symbol group obtained by using another mapping solution. This is not limited in this application. Similarly, the N complex symbol groups on which the interleaving processing is performed are not limited to the N complex symbol groups obtained by using the embodiment shown in FIG. 1, and may alternatively be applied to a complex symbol group obtained by using another mapping solution. This is not limited in this application.

Based on the above, according to the method provided in the embodiment shown in FIG. 1, the terminal device divides the to-be-sent data into the N bit groups, and then processes the bit groups by using the mapping rules corresponding to the bit groups, to generate the N complex symbol groups. The mapping rule corresponding to each bit group is determined based on the group identity of the bit group and the first parameter. Different terminal devices correspond to different first parameters. Therefore, a group of mapping rules used by the different terminal devices are not completely the same, thereby randomizing interference between the terminal devices, avoiding a decoding failure of the network device that occurs when the plurality of terminal devices generates signals by using a similar or same mapping rule, and improving a demodulation success rate of the network device.

The following describes the embodiment shown in FIG. 1 in detail with reference to specific embodiments.

Embodiment 1

The network device configures the pilot parameter for the terminal device. The to-be-sent data includes m*N bits. It is assumed that each bit group includes m bits. In this case, the terminal device groups the m*N bits into the N bit groups.

Optionally, the m*N bits may be obtained by performing at least one of error correction coding, bit-level interleaving, or bit-level scrambling.

It is assumed that there are a total of Q mapping rules predefined in the system. A $q^{th}$ mapping rule is used for an $n^{th}$ bit groups (0≤n≤N−1, 0≤q≤Q−1), and the m bits included in each group are mapped to L complex symbols.

If the network device and the terminal device agree on that parameters used to determine a mapping rule include the cell identity, the slot number, the pilot parameter, the group identity of the bit group, and a total quantity of mapping rules, the $q^{th}$ mapping rule used for the $n^{th}$ bit group may be determined by using the following formula:

$$q=\mathrm{mod}(f(\text{Cell identity}, \text{Slot number}, \text{Pilot parameter}, n), Q)  \quad (1),$$ where f(x) is any function.

Specifically, when the pilot parameter is an antenna port number corresponding to the pilot, the $q^{th}$ mapping rule used for the $n^{th}$ bit group may be determined by using any one of the following formulas:

$$q = \left(\sum_{i=0}^{7} c(8n+i)2^i\right) \bmod Q, \text{ and}$$

$$c_{init} = 2^{P_1} * \text{Cell identity} + 2^{P_2} * \text{Slot number} + 2^{P_3} * \text{Port number (2);}$$

or $$q = \left(\sum_{i=0}^{7} c(8N*\text{Slot number}+8n+i)2^i\right) \bmod Q, \text{ and}$$

$$c_{init} = 2^{P_i} * \text{Cell identity} + 2^{P_3} * \text{Port number (3); or}$$

$$q = \left(\sum_{i=0}^{7} c(8N*\text{Total quantity of slots in a radio frame}*\text{Port number}+8N*\text{Slot number}+8n+i)2^i\right)$$

$$\bmod Q, \text{ and } c_{init} = 2^{P_1} * \text{Cell identity (4),}$$

where c is a pseudo-random sequence (for example, a Gold sequence or an m sequence), an initial value of the pseudo-random sequence is $C_{init}$, c is determined based on $C_{init}$, P1, P2, and P3 are preset integers, and P1, P2, and P3 are any integers.

If the network device and the terminal device agree on that parameters used to determine a mapping rule include the cell identity, the slot number, the pilot parameter, the group identity of the bit group, a total quantity of mapping rules, and the periodicity P, the $q^{th}$ mapping rule used for the $n^{th}$ bit group may be determined by using the following formula:

$q=\text{mod}(f(\text{Cell identity, Slot number, Pilot parameter,} \bmod(n,P)),Q)$     (5), where f(x) is any function.

Specifically, when the pilot parameter is an antenna port number corresponding to the pilot, the $q^{th}$ mapping rule used for the $n^{th}$ bit group may be determined by using any one of the following formulas:

$$q = \left(\sum_{i=0}^{7} c(8n'+i)2^i\right) \bmod Q, \text{ and } c_{init} =$$

$$2^{P_1} * \text{Cell identity} + 2^{P_1} * \text{Slot number} + 2^{P_3} * \text{Port number (6); or}$$

$$q = \left(\sum_{i=0}^{7} c(8N*\text{Slot number}+8n'+i)2^i\right) \bmod Q, \text{ and}$$

$$c_{init} = 2^{P_1} * \text{Cell identity} + 2^{P_3} * \text{Port number (7); or}$$

$$q = \left(\sum_{i=0}^{7} c(8N*\text{Total quantity of slots in a radio frame}*\text{Port number}+8N*\text{Slot number}+8n'+i)2^i\right)$$

$$\bmod Q, \text{ and } c_{init} = 2^{P_1} * \text{Cell identity (8),}$$

where c is a pseudo-random sequence (for example, a Gold sequence or an m sequence), an initial value of the pseudo-random sequence is $C_{init}$, c is determined based on $C_{init}$, n'=n mod P, and P1, P2, and P3 are any integers.

Finally, the terminal device generates the N complex symbol groups, each complex symbol group includes L complex symbols, to be specific, the terminal device maps the m*N bits to m*L complex symbols.

Optionally, if the terminal device needs to perform K times of retransmission, the mapping rules corresponding to the N bit groups during each transmission are respectively the same as the mapping rules corresponding to the N bit groups during the initial transmission.

If the network device and the terminal device agree on that parameters used to determine a mapping rule include the cell identity, the slot number, the pilot parameter, the group identity of the bit group, and a total quantity of mapping rules, and a $q^{th}$ mapping rule used by the terminal device for the $n^{th}$ bit group during $k^{th}$ (k=2, ..., K) retransmission is the same as a $q^{th}$ mapping rule used by the terminal device for the $n^{th}$ bit group during first retransmission, the $q^{th}$ mapping rule used for the $n^{th}$ bit group may be determined by using the following formula:

$q=\text{mod}(f(\text{Cell identity, Slot number of the initial transmission, Pilot parameter,}n),Q)$   (9).

Specifically, when the pilot parameter is an antenna port number corresponding to the pilot, the $q^{th}$ mapping rule used for the $n^{th}$ bit group may be determined by using any one of the following formulas:

$$q = \left(\sum_{i=0}^{7} c(8n+i)2^i\right) \bmod Q, \text{ and}$$

$$c_{init} = 2^{P_1} * \text{Cell identity} +$$

$$2^{P_2} * \text{Slot number of the initial transmission} + 2^{P_3} * \text{Port number (10); or}$$

$$q = \left(\sum_{i=0}^{7} c(8N*\text{Slot number of the initial transmission}+8n+i)2^i\right) \bmod Q, \text{ and}$$

$$c_{init} = 2^{P_1} * \text{Cell identity} + 2^{P_3} * \text{Port number (11); or}$$

-continued $$q = \left(\sum_{i=0}^{7} c(8N * \text{Total quantity of slots in a radio frame} * \text{Port number} + 8N * \text{Slot number of the initial transmission} + 8n + i)2^i\right) \bmod Q, \text{ and}$$

$$c_{init} = 2^{P_1} * \text{Cell identity} \tag{12},$$

where c is a pseudo-random sequence (for example, a Gold sequence or an m sequence), an initial value of the pseudo-random sequence is $C_{init}$, c is determined based on $C_{init}$, and P1, P2, and P3 are any integers.

If the network device and the terminal device agree on that parameters used to determine a mapping rule include the cell identity, the slot number, the pilot parameter, the group identity of the bit group, a total quantity of mapping rules, and the periodicity P, and a $q^{th}$ mapping rule used by the terminal device for the $n^{th}$ bit group during $k^{th}$ retransmission is the same as a $q^{th}$ mapping rule used by the terminal device for the $n^{th}$ bit group during first retransmission, the $q^{th}$ mapping rule used for the $n^{th}$ bit group may be determined by using the following formula:

$$q = \bmod(f(\text{Cell identity},\text{Slot number of the initial transmission},\text{Pilot parameter},\bmod(n,P)),Q) \tag{13}.$$

Specifically, when the pilot parameter is an antenna port number corresponding to the pilot, the $q^{th}$ mapping rule used for the $n^{th}$ bit group may be determined by using any one of the following formulas:

$$q = \left(\sum_{i=0}^{7} c(8n' + i)2^i\right) \bmod Q, \text{ and}$$

$$c_{init} = 2^{P_1} * \text{Cell identity} + 2^{P_2} * \text{Slot number of the initial transmission} + 2^{P_3} * \text{Port number} \tag{14}; \text{ or}$$

$$q = \left(\sum_{i=0}^{7} c(8N * \text{Slot number of the initial transmission} + 8n' + i)2^i\right) \bmod Q, \text{ and}$$

$$c_{init} = 2^{P_1} * \text{Cell identity} + 2^{P_3} * \text{Port number} \tag{15}; \text{ or}$$

$$q = \left(\sum_{i=0}^{7} c(8N * \text{Total quantity of slots in radio frame} * \text{Port number} + 8N * \text{Slot number of the initital transmission} + 8n' + i)2^i\right) \bmod Q,$$

$$\text{and } c_{init} = 2^{P_1} * \text{Cell identity} \tag{16},$$

where c is a pseudo-random sequence (for example, a Gold sequence or an m sequence), an initial value of the pseudo-random sequence is $C_{init}$, c is determined based on $C_{init}$, n'=n mod P, and P1, P2, and P3 are any integers.

If the network device and the terminal device agree on that parameters used to determine a mapping rule include the cell identity, the pilot parameter, the group identity of the bit group, and a total quantity of mapping rules, and a $q^{th}$ mapping rule used by the terminal device for the $n^{th}$ bit group during $k^{th}$ retransmission is the same as a $q^{th}$ mapping rule used by the terminal device for the $n^{th}$ bit group during first retransmission, the $q^{th}$ mapping rule used for the $n^{th}$ bit group may be determined by using the following formula:

$$q = \bmod(f(\text{Cell identity},\text{Pilot parameter},n),Q) \tag{17}.$$

Specifically, when the pilot parameter is an antenna port number corresponding to the pilot, the $q^{th}$ mapping rule used for the $n^{th}$ bit group may be determined by using the following formula:

$$q = \left(\sum_{i=0}^{7} c(8n + i)2^i\right) \bmod Q, \text{ and}$$

$$c_{init} = 2^{P_1} * \text{Cell identity} + 2^{P_2} * \text{Port number} \tag{18},$$

where c is a pseudo-random sequence (for example, a Gold sequence or an m sequence), an initial value of the pseudo-random sequence is $C_{init}$, c is determined based on $C_{init}$, and P1 and P2 are any integers.

If the network device and the terminal device agree on that parameters used to determine a mapping rule include the cell identity, the pilot parameter, the group identity of the bit group, a total quantity of mapping rules, and the periodicity P, the $q^{th}$ mapping rule used for the $n^{th}$ bit group may be determined by using the following formula:

$$q = \mod(f(\text{Cell identity}, \text{Pilot parameter}, \mod(n, P)), Q) \quad (19).$$

Specifically, when the pilot parameter is an antenna port number corresponding to the pilot, the $q^{th}$ mapping rule used for the $n^{th}$ bit group may be determined by using the following formula:

$$q = \left(\sum_{i=0}^{7} c(8n+i)2^i\right) \mod Q, \text{ and}$$

$$c_{init} = 2^{P1} * \text{Cell identity} + 2^{P2} * \text{Port number} \quad (20),$$

where c is a pseudo-random sequence (for example, a Gold sequence or an m sequence), an initial value of the pseudo-random sequence is $C_{init}$, c is determined based on $C_{init}$, n'=n mod P and P and P2 are any integers.

In an embodiment, the pilot parameter, the hopping identity, and the terminal device identity in the foregoing formulas may be replaced with the layer index of the non-orthogonal layer. In another embodiment, the layer index of the non-orthogonal layer may further be added to a calculation formula of the initial value $C_{init}$ of the pseudo-random sequence. For example, "2P4*Layer index of the non-orthogonal layer" is further added to each formula of the initial value $C_{init}$, where P4 is a preset integer.

It should be noted that the foregoing formulas used to determine the mapping rule is merely an example, and there may be another implementation. This is not limited in this application.

Embodiment 2

The network device configures the pilot parameter and the hopping identity for the terminal device, where there is a correspondence between the hopping identity and the pilot parameter. According to the method for determining a mapping rule corresponding to each bit group shown in Embodiment 1, if the first parameter that is agreed on by the network device and the terminal device and that is used to determine the mapping rule is the hopping identity, the pilot parameter or the antenna port number in Embodiment 1 may directly be replaced with the hopping identity, to obtain a mapping rule that corresponds to each bit group and that is determined by using the hopping identity. Details are not repeated.

Embodiment 3

The network device configures the pilot parameter for the terminal device, where there is a correspondence between the terminal device identity and the pilot parameter.

According to the method for determining a mapping rule corresponding to each bit group shown in Embodiment 1, if the first parameter that is agreed on by the network device and the terminal device and that is used to determine the mapping rule is the terminal device identity, the pilot parameter or the antenna port number in Embodiment 1 may directly be replaced with the terminal device identity, to obtain a mapping rule that corresponds to each bit group and that is determined by using the terminal device identity. Details are not repeated.

Figure 3:
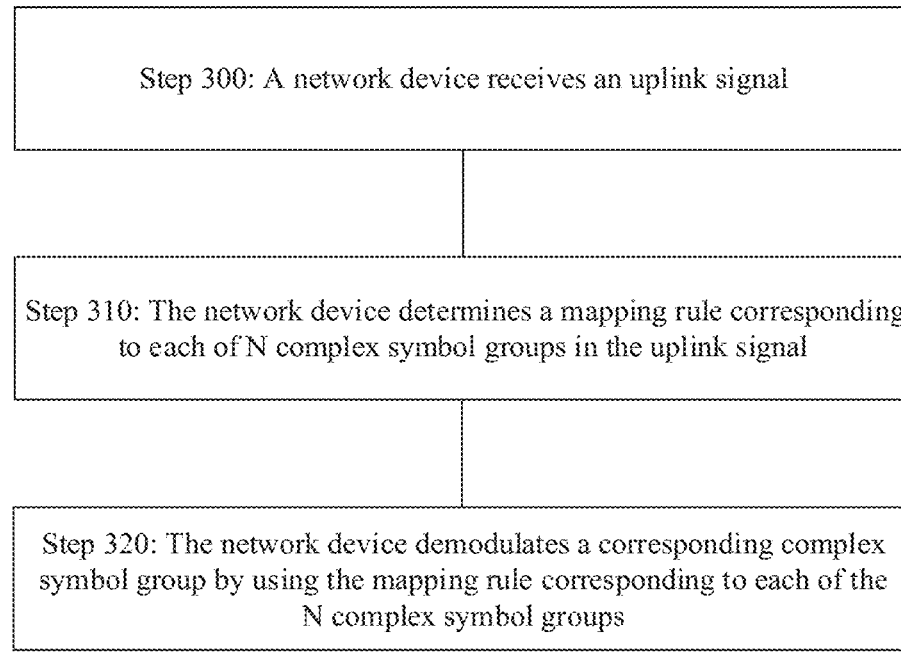
FIG. 3 is an overview flowchart of a data demodulation method according to an embodiment of this application.

Referring to FIG. 3, an embodiment of this application provides a data demodulation method. For a receive end, the method includes the following steps.

Step 300: A network device receives an uplink signal.

It should be understood that the uplink signal may include an uplink signal received from one terminal device, or may include uplink signals received from a plurality of terminal devices.

Step 310: The network device determines a mapping rule corresponding to each of N complex symbol groups in the uplink signal, where N≥2 and N is an integer.

Step 320: The network device demodulates a corresponding complex symbol group by using the mapping rule corresponding to each of the N complex symbol groups.

A mapping rule corresponding to an $i^{th}$ complex symbol group is determined based on a group identity of the $i^{th}$ complex symbol group and a first parameter, the first parameter includes at least one of a pilot parameter, a hopping identity, a terminal device identity, a layer index of a non-orthogonal layer, and a hopping offset, the N complex symbol groups correspond to at least two different mapping rules, 0≤i≤N−1, and i is an integer.

It should be understood that the network device learns about a quantity of complex symbols included in each complex symbol group, and can determine a quantity of complex symbol groups included in the uplink signal.

For example, the uplink signal includes N×L complex symbols. It is assumed that each complex symbol group includes L complex symbols. In this case, the network device determines that there are N complex symbol groups.

If the network device detects one pilot in the uplink signal, the network device determines the mapping rule corresponding to each of the N complex symbol groups, based on a pilot parameter corresponding to the pilot, a hopping identity corresponding to the pilot, a terminal device identity corresponding to the pilot, or a hopping offset corresponding to the pilot, demodulates a corresponding complex symbol group by using the mapping rule corresponding to each of the N complex symbol groups, and performs subsequent processing on a demodulation result, to obtain N bit groups. Alternatively, if the network device detects one pilot in the uplink signal, the network device determines, based on a layer index of at least one non-orthogonal layer corresponding to the pilot, at least one of the N complex symbol groups that corresponds to each non-orthogonal layer, then determines the mapping rule corresponding to each of the N complex symbol groups, demodulates a corresponding complex symbol group by using the mapping rule corresponding to each of the N complex symbol groups, and performs subsequent processing on a demodulation result, to obtain N bit groups.

If the network device detects a plurality of pilots in the uplink signal, the network device determines a group of mapping rules corresponding to each pilot, based on a pilot parameter corresponding to each pilot, a hopping identity corresponding to each pilot, a terminal device identity corresponding to each pilot, a layer index of at least one non-orthogonal layer corresponding to each pilot, or a hopping offset corresponding to each pilot, where each group of mapping rules includes the mapping rule corresponding to each of the N complex symbol groups, demodulates a corresponding complex symbol group by using the group of mapping rules corresponding to each pilot, and performs subsequent processing on a demodulation result, to obtain N bit groups corresponding to each pilot.

Herein, the subsequent processing on the demodulation result includes bit-level descrambling, and/or bit-level deinterleaving, and/or the like.

For example, it is assumed that a terminal device A and a terminal device B separately send N complex symbol groups to the network device on a same resource. In this case, the network device detects two pilots in the received uplink signal, and determines, based on a pilot parameter corresponding to each pilot, a group of mapping rules corresponding to each pilot, where each group of mapping rules includes a mapping rule corresponding to each of the N complex symbol groups. Therefore, a total of two groups of mapping rules are obtained. The network device demodulates the N complex symbol groups in the uplink signal by using the two groups of mapping rules, and performs subsequent processing on a demodulation result, to obtain N bit groups corresponding to each of the two pilots.

It should be understood that, N mapping rules used by the terminal device A to generate the N complex symbol groups may be partially the same as N mapping rules used by the terminal device B to generate the N complex symbol groups. Therefore, when demodulating the N complex symbol groups in the uplink signal by using the two groups of mapping rules, the network device may fail to demodulate a complex symbol group generated by using a same mapping rule. However, because the N mapping rules used by the terminal device A to generate the N complex symbol groups are mostly different from the N mapping rules used by the terminal device B to generate the N complex symbol groups, the network device can correctly demodulate most of the complex symbol groups, thereby improving a demodulation success rate.

A parameter that is configured by the network device for the terminal device and that is used to determine a mapping rule specifically includes the following possible forms.

Manner 1: A parameter that is configured by the network device for the terminal device and that is used to determine the mapping rule corresponding to the $i^{th}$ complex symbol group includes the pilot parameter.

Therefore, the network device can determine the mapping rule corresponding to each of the N complex symbol groups, based on the pilot parameter corresponding to the pilot in the uplink signal and a group identity corresponding to each of the N complex symbol groups.

The mapping rule corresponding to the $i^{th}$ complex symbol group is determined based on the group identity of the $i^{th}$ complex symbol group and the pilot parameter.

Manner 2: A parameter that is configured by the network device for the terminal device and that is used to determine the mapping rule corresponding to the $i^{th}$ complex symbol group includes the hopping identity.

Therefore, the network device determines, based on the pilot in the uplink signal, the hopping identity corresponding to the pilot, so that the network device can determine, based on the hopping identity and a group identity that corresponds to each of the N complex symbol groups, the mapping rule corresponding to each of the N complex symbol groups.

The mapping rule corresponding to the $i^{th}$ complex symbol group is determined based on the group identity of the $i^{th}$ complex symbol group and the hopping identity.

Manner 3: A parameter that is configured by the network device for the terminal device and that is used to determine the mapping rule corresponding to the $i^{th}$ complex symbol group includes the terminal device identity.

Therefore, the network device determines, based on the pilot in the uplink signal, the terminal device identity corresponding to the pilot, so that the network device can determine, based on the terminal device identity and a group identity that corresponds to each of the N complex symbol groups, the mapping rule corresponding to each of the N complex symbol groups.

The mapping rule corresponding to the $i^{th}$ complex symbol group is determined based on the group identity of the $i^{th}$ complex symbol group and the terminal device identity.

Manner 4: A parameter that is configured by the network device for the terminal device and that is used to determine the mapping rule corresponding to the $i^{th}$ complex symbol group includes the layer index of the non-orthogonal layer.

Therefore, the network device determines layer indexes of M non-orthogonal layers, where M is a positive integer.

It should be understood that the determining, by the network device, the layer indexes of the M non-orthogonal layers is determining, by the network device, a layer index of a non-orthogonal layer corresponding to the terminal device that sends the uplink signal. The network device determines, by using a same method, a layer index of a non-orthogonal layer corresponding to each terminal device that sends the uplink signal. Specifically, the network device may determine the layer indexes of the M non-orthogonal layers in the following two manners.

Manner A: The network device may determine the layer indexes of the M non-orthogonal layers based on a pilot in the uplink signal. When the uplink signal includes a plurality of pilots, the network device may determine a corresponding layer index of at least one non-orthogonal layer based on each pilot. The network device pre-stores the layer index of the at least one non-orthogonal layer corresponding to each pilot.

Manner B: The network device schedules at least one terminal device to send the uplink signal. After receiving the uplink signal, the network device learns about one or more terminal devices that send the uplink signal, and then determines a layer index of at least one non-orthogonal layer corresponding to each terminal device. The network device pre-stores the layer index of the at least one non-orthogonal layer corresponding to each terminal device. The network device first determines at least one of the N complex symbol groups that corresponds to each of the M non-orthogonal layers, where an $m^{th}$ non-orthogonal layer corresponds to $s_m$ complex symbol groups, $$\sum_{1}^{M} s_m = N,$$

the $m^{th}$ non-orthogonal layer is any one of the M non-orthogonal layers, m≤M, and m is a positive integer.

The network device then determines, based on the layer indexes of the M non-orthogonal layers and a group identity of each of the N complex symbol groups, the mapping rule corresponding to each of the N complex symbol groups, where a mapping rule that corresponds to each of the $s_m$ complex symbol groups corresponding to the $m^{th}$ non-orthogonal layer is determined by the network device based on a layer index of the $m^{th}$ non-orthogonal layer and a group identity that corresponds to each of the $s_m$ complex symbol groups corresponding to the $m^{th}$ non-orthogonal layer the $m^{th}$ non-orthogonal layer is any one of the M non-orthogonal layers, m≤M, and m is a positive integer.

The mapping rule corresponding to the $i^{th}$ complex symbol group is determined based on the group identity of the $i^{th}$ complex symbol group and the layer index of the non-orthogonal layer corresponding to the $i^{th}$ complex symbol group.

Manner 5: A parameter that is configured by the network device for the terminal device and that is used to determine the mapping rule corresponding to the $i^{th}$ complex symbol group includes the hopping offset.

Therefore, the network device determines, based on the pilot in the uplink signal, the hopping offset corresponding to the pilot, so that the network device can determine, based on the hopping offset and a group identity that corresponds to each of the N complex symbol groups, the mapping rule corresponding to each of the N complex symbol groups.

The mapping rule corresponding to the $i^{th}$ complex symbol group is determined based on the group identity of the $i^{th}$ complex symbol group and the hopping offset.

Similarly, the parameter that is configured by the network device for the terminal device and that is used to determine a mapping rule may further include a second parameter. The second parameter includes at least one of a cell identity, a time domain resource sequence number, and a periodicity P.

In addition, in a possible design, before demodulating the N complex symbol groups by using the mapping rule corresponding to each of the N complex symbol groups, the network device needs to perform descrambling processing on scrambling-processed N complex symbol groups in the uplink signal, to obtain the N complex symbol groups, where a scrambling sequence used during the descrambling processing is determined based on at least one of the first parameter, the time domain resource sequence number, and the cell identity.

It should be understood that a scrambling sequence that is used by the terminal device to perform scrambling processing on the N complex symbol groups before the terminal device sends the N complex symbol groups is the same as the scrambling sequence used by the network device to perform the descrambling processing on the N complex symbol groups before the network device demodulates the N complex symbols groups.

In a possible design, before demodulating the N complex symbol groups by using the mapping rule corresponding to each of the N complex symbol groups, the network device needs to perform deinterleaving processing on interleaving-processed N complex symbol groups in the uplink signal, to obtain the N complex symbol groups, where an interleaving pattern used during the deinterleaving processing is determined based on at least one of the first parameter, the time domain resource sequence number, and the cell identity.

It should be understood that an interleaving pattern that is used by the terminal device to perform interleaving processing on the N complex symbol groups before the terminal device sends the N complex symbol groups is the same as the interleaving pattern used by the network device to perform the deinterleaving processing on the N complex symbol groups before the network device demodulates the N complex symbols groups.

It should be understood that both A mod B and mod(A, B) represent a modulo operation on A using B, that is, A−floor(A/B)*B, where floor represents rounding down.

Figure 4:
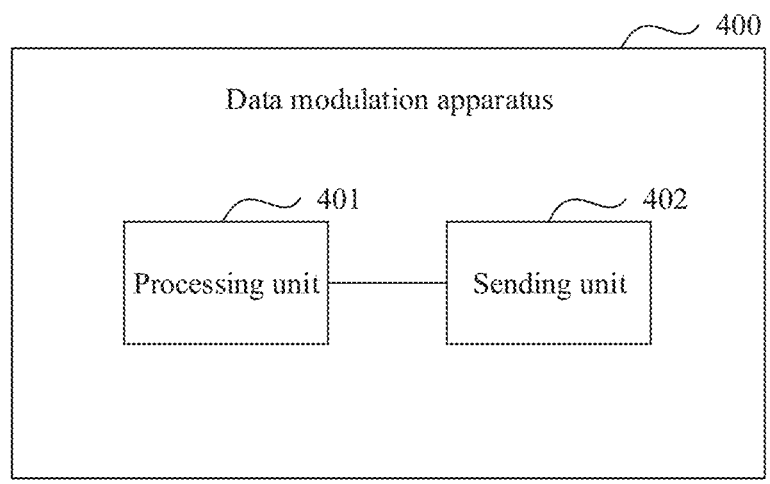
FIG. 4 is a schematic structural diagram of a data modulation apparatus according to an embodiment of this application.

Based on the foregoing embodiment, an embodiment of this application provides a data modulation apparatus. As shown in FIG. 4, the apparatus 400 includes:

a processing unit 401, configured to: divide to-be-sent data into N bit groups, where N≥2 and N is an integer; and generate N complex symbol groups, where an $i^{th}$ complex symbol group is obtained by processing an $i^{th}$ bit group by using a mapping rule corresponding to the $i^{th}$ bit group, the mapping rule corresponding to the $i^{th}$ bit group is determined based on a group identity of the $i^{th}$ bit group and a first parameter, the first parameter includes at least one of a pilot parameter, a hopping identity, a terminal device identity, a layer index of a non-orthogonal layer, and a hopping offset, the N bit groups correspond to at least two different mapping rules, 0≤i≤N−1, and i is an integer; and a sending unit 402, configured to send the N complex symbol groups.

In a possible design, the mapping rule corresponding to the $i^{th}$ bit group is determined based on the group identity of the $i^{th}$ bit group, the first parameter, and a second parameter, and the second parameter includes at least one of a cell identity, a time domain resource sequence number, and a periodicity P.

In a possible design, when the to-be-sent data is retransmitted, mapping rules corresponding to the N bit groups during each transmission are respectively the same as mapping rules corresponding to the N bit groups during initial transmission.

In a possible design, the terminal device identity is a radio network temporary identity RNTI, a radio resource control RRC identity, or a temporary mobile subscriber identity TMSI.

In a possible design, the processing unit 401 is further configured to:

perform scrambling processing on the N complex symbol groups before the sending unit 402 sends the N complex symbol groups, where a scrambling sequence used during the scrambling processing is determined based on at least one of the first parameter, the time domain resource sequence number, and the cell identity.

The sending unit 402 is specifically configured to:

send a signal obtained after the N complex symbol groups are scrambling-processed.

In a possible design, the processing unit 401 is further configured to:

perform interleaving processing on the N complex symbol groups before the sending unit 402 sends the N complex symbol groups, where an interleaving pattern used during the interleaving processing is determined based on at least one of the first parameter, the time domain resource sequence number, and the cell identity.

The sending unit 402 is specifically configured to:

send a signal obtained after the N complex symbol groups are interleaving-processed.

It may be understood that, for specific implementations and corresponding beneficial effects of function modules included in the data modulation apparatus in FIG. 4, refer to the specific descriptions of the embodiment shown in FIG. 2. Details are not described herein.

In another optional variation, an embodiment of this application provides a data modulation apparatus. For example, the data modulation apparatus may be a chip. The apparatus includes a processor and an interface. The processor completes a function of the processing unit 401, and the interface completes a function of the sending unit 402 and is configured to output the N complex symbol groups. The apparatus may further include a memory. The memory is configured to store a program that can run on the processor. When executing the program, the processor implements the method in the foregoing embodiment.

Figure 5:
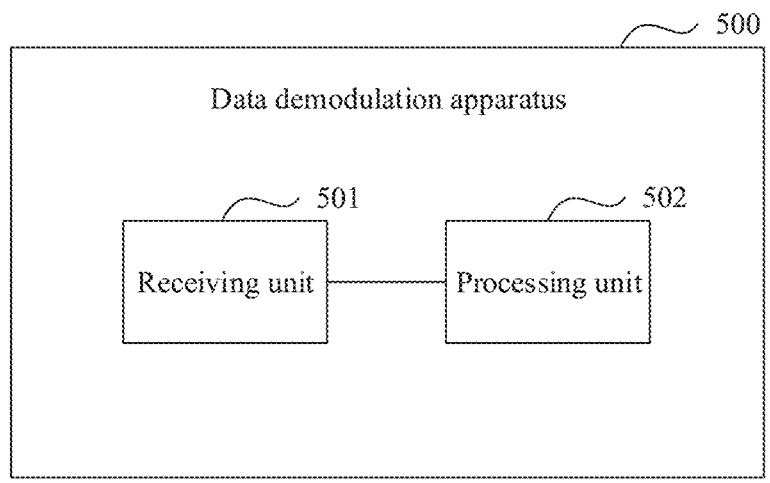
FIG. 5 is a schematic structural diagram of a data demodulation apparatus according to an embodiment of this application.

Based on the foregoing embodiment, an embodiment of this application provides a data demodulation apparatus. As shown in FIG. 5, the apparatus 500 includes:

a receiving unit 501, configured to receive an uplink signal; and a processing unit 502, configured to: determine a mapping rule corresponding to each of N complex symbol groups in the uplink signal, where N≥2 and N is an integer; and demodulate a corresponding complex symbol group by using the mapping rule corresponding to each of the N complex symbol groups, where a mapping rule corresponding to an $i^{th}$ complex symbol group is determined based on a group identity of the $i^{th}$ complex symbol group and a first parameter, the first parameter includes at least one of a pilot parameter, a hopping identity, a terminal device identity, a layer index of a non-orthogonal layer, and a hopping offset, the N complex symbol groups correspond to at least two different mapping rules, $0 \leq i \leq N-1$, and i is an integer.

In a possible design, the mapping rule corresponding to the $i^{th}$ complex symbol group is determined based on the group identity of the $i^{th}$ complex symbol group, the first parameter, and a second parameter, and the second parameter includes at least one of a cell identity, a time domain resource sequence number, and a periodicity P.

In a possible design, the processing unit 502 is further configured to:

determine that mapping rules corresponding to the N complex symbol groups during non-initial transmission are respectively the same as mapping rules corresponding to the N complex symbol groups during initial transmission.

In a possible design, the terminal device identity is a radio network temporary identity RNTI, a radio resource control RRC identity, or a temporary mobile subscriber identity TMSI.

In a possible design, the processing unit 502 is specifically configured to:

determine, based on a pilot in the uplink signal, a pilot parameter corresponding to the pilot; and determine, based on the pilot parameter and a group identity of each of the N complex symbol groups, the mapping rule corresponding to each of the N complex symbol groups.

In a possible design, the processing unit 502 is specifically configured to:

determine the hopping identity based on a pilot in the uplink signal; and determine, based on the hopping identity and a group identity of each of the N complex symbol groups, the mapping rule corresponding to each of the N complex symbol groups.

In a possible design, the processing unit 502 is specifically configured to:

determine the terminal device identity based on a pilot in the uplink signal; and determine, based on the terminal device identity and a group identity of each of the N complex symbol groups, the mapping rule corresponding to each of the N complex symbol groups.

In a possible design, the processing unit 502 is specifically configured to:

determine layer indexes of M non-orthogonal layers, where M is a positive integer;

determine at least one of the N complex symbol groups that corresponds to each of the M non-orthogonal layers, where an $m^{th}$ non-orthogonal layer corresponds to $s_m$ complex symbol groups, $$\sum_{1}^{M} s_m = N,$$

the $m^{th}$ non-orthogonal layer is any one of the M non-orthogonal layers, $m \leq M$, and m is a positive integer; and determine, based on the layer indexes of the M non-orthogonal layers and a group identity of each of the N complex symbol groups, the mapping rule corresponding to each of the N complex symbol groups, where a mapping rule that corresponds to each of the $s_m$ complex symbol groups corresponding to the $m^{th}$ non-orthogonal layer is determined by the network device based on a layer index of the $m^{th}$ non-orthogonal layer and a group identity that corresponds to each of the $s_m$ complex symbol groups corresponding to the $m^{th}$ non-orthogonal layer.

In a possible design, the processing unit 502 is specifically configured to:

determine the hopping offset based on a pilot in the uplink signal; and determine, based on the hopping offset and a group identity of each of the N complex symbol groups, the mapping rule corresponding to each of the N complex symbol groups.

In a possible design, the processing unit 502 is further configured to:

perform descrambling processing on scrambling-processed N complex symbol groups in the uplink signal before the processing unit 502 demodulates the N complex symbol groups by using the mapping rule corresponding to each of the N complex symbol groups, to obtain the N complex symbol groups, where a scrambling sequence used during the descrambling processing is determined based on at least one of the first parameter, the time domain resource sequence number, and the cell identity.

In a possible design, the processing unit 502 is further configured to:

perform deinterleaving processing on interleaving-processed N complex symbol groups in the uplink signal before the processing unit 502 demodulates the N complex symbol groups by using the mapping rule corresponding to each of the N complex symbol groups, to obtain the N complex symbol groups, where an interleaving pattern used during the deinterleaving processing is determined based on at least one of the first parameter, the time domain resource sequence number, and the cell identity.

It may be understood that, for specific implementations and corresponding beneficial effects of function modules included in the data demodulation apparatus in FIG. 5, refer to the specific descriptions of the embodiment shown in FIG. 3. Details are not described herein.

It should be understood that division of the foregoing units is merely logical function division. During actual implementation, all or some of the units may be integrated into one physical entity, or may be physically separate. In addition, all the units may be implemented in a form of software invoked by a processing element, or may be implemented in a form of hardware; or some units may be implemented in a form of software invoked by a processing element, and some units may be implemented in a form of hardware. In an implementation process, steps in the foregoing method or the foregoing units may be implemented by using a hardware integrated logical circuit in the processing element, or by using instructions in a form of software.

For example, the foregoing units may be configured as one or more integrated circuits for implementing the foregoing method, for example, one or more application-specific integrated circuits (Application Specific Integrated Circuit, ASIC), or one or more microprocessors (digital signal processor, DSP), or one or more field programmable gate arrays (Field Programmable Gate Array, FPGA). For another example, when one of the foregoing units is implemented by a processing element invoking a program, the processing element may be a general-purpose processor, for example, a central processing unit (Central Processing Unit, CPU) or another processor that can invoke a program. For still another example, the units may be integrated and implemented in a form of a system on a chip (system-on-a-chip, SOC).

In another optional variation, an embodiment of this application provides a data demodulation apparatus. For example, the data demodulation apparatus may be a chip. The apparatus includes a processor and an interface, and the interface may be an input/output interface. The processor completes a function of the processing unit 502, and the interface completes a function of the receiving unit 501 and is configured to input an uplink signal. The apparatus may further include a memory. The memory is configured to store a program that can run on the processor. When executing the program, the processor implements the method in the foregoing embodiment.

Figure 6:
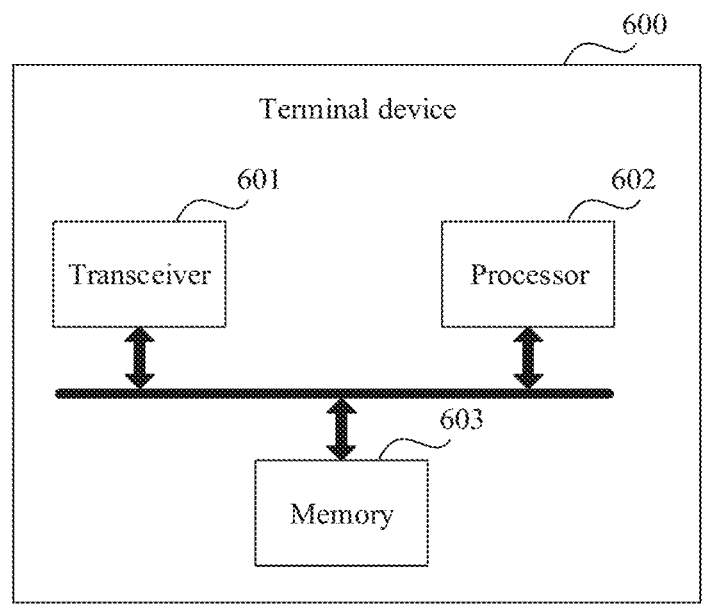
FIG. 6 is a schematic structural diagram of a terminal device according to an embodiment of this application.

Based on the foregoing embodiment, an embodiment of this application further provides a terminal device. The terminal device may be the terminal device in the embodiment shown in FIG. 2. Referring to FIG. 6, the terminal device 600 includes a transceiver 601, a processor 602, and a memory 603. The memory 603 is configured to store a computer program. The processor 602 invokes the computer program stored in the memory 603, and performs, by using the transceiver 601, the method shown in FIG. 2.

It may be understood that the data modulation apparatus in the embodiment shown in FIG. 4 may be implemented by the terminal device 600 shown in FIG. 6. Specifically, the processing unit 401 may be implemented by the processor 602, and the sending unit 402 may be implemented by the transceiver 601. A structure of the terminal device 600 does not constitute a limitation on the embodiments of this application.

Figure 7:
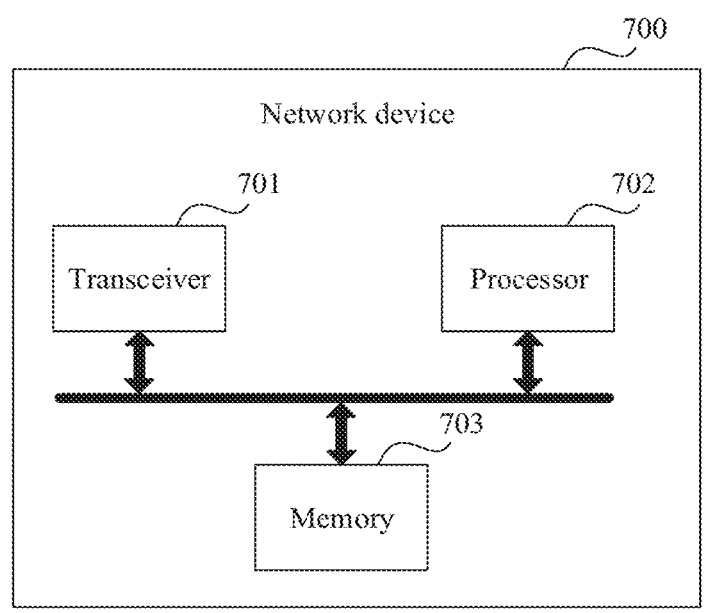
FIG. 7 is a schematic structural diagram of a network device according to an embodiment of this application.

Based on the foregoing embodiment, an embodiment of this application further provides a network device. The network device may be the network device in the embodiment shown in FIG. 3. Referring to FIG. 7, the network device 700 includes a transceiver 701, a processor 702, and a memory 703. The memory 703 is configured to store a computer program. The processor 702 invokes the computer program stored in the memory 703, and performs, by using the transceiver 701, the method shown in FIG. 3.

It may be understood that the data demodulation apparatus in the embodiment shown in FIG. 5 may be implemented by the network device 700 shown in FIG. 7. Specifically, the receiving unit 501 may be implemented by the transceiver 701, and the processing unit 502 may be implemented by the processor 702. A structure of the network device 700 does not constitute a limitation on the embodiments of this application.

In FIG. 6 and FIG. 7, the processor may be a CPU, a network processor (network processor, NP), a hardware chip, or any combination thereof. The memory may include a volatile memory (volatile memory), for example, a random access memory (random access memory, RAM), or may include a nonvolatile memory (non-volatile memory), for example, a read-only memory (read-only memory, ROM), a flash memory (flash memory), a hard disk drive (hard disk drive, HDD), or a solid-state drive (solid-state drive, SSD), or may include a combination of the foregoing types of memories.

Based on the above, the terminal device divides the to-be-sent data into the N bit groups, and then processes the bit groups by using the mapping rules corresponding to the bit groups, to generate the N complex symbol groups. The mapping rule corresponding to each bit group is determined based on the group identity of the bit group and the first parameter. Different terminal devices correspond to different first parameters. Therefore, a group of mapping rules used by the different terminal devices are not completely the same, thereby randomizing interference between the terminal devices, improving a demodulation success rate of the network device, and avoiding a decoding failure of the network device that occurs when the plurality of terminal devices generates signals by using a similar or same mapping rule.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operation steps are performed on the computer or another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A data modulation method, comprising:
dividing, by a terminal device, to-be-sent data into N bit groups, wherein N≥2 and N is an integer;
generating, by the terminal device, N complex symbol groups, wherein
an $i^{th}$ complex symbol group is obtained by processing an $i^{th}$ bit group based on a mapping rule corresponding to the $i^{th}$ bit group,
the mapping rule corresponding to the $i^{th}$ bit group is determined based on at least a group identity of the $i^{th}$ bit group and a first parameter,
the first parameter comprises a hopping offset,
the N bit groups correspond to at least two different mapping rules,
$0 \leq i \leq N-1$, and
i is an integer; and
sending, by the terminal device, the N complex symbol groups.

2. The method according to claim 1, wherein
the mapping rule corresponding to the $i^{th}$ bit group is determined based on the group identity of the $i^{th}$ bit group, the first parameter, and a second parameter, and
the second parameter comprises at least one of a cell identity, a time domain resource sequence number, or a periodicity P.

3. The method according to claim 1, wherein when the terminal device retransmits the to-be-sent data, mapping rules corresponding to the N bit groups during each transmission are respectively the same as mapping rules corresponding to the N bit groups during an initial transmission.

4. The method according to claim 1, wherein the first parameter further comprises a radio network temporary identity (RNTI), a radio resource control (RRC) identity, or a temporary mobile subscriber identity (TMSI).

5. The method according to claim 2, wherein before the sending, by the terminal device, of the N complex symbol groups, the method further comprises:
performing, by the terminal device, scrambling processing on the N complex symbol groups, wherein a scrambling sequence used during the scrambling processing is determined based on at least one of the first parameter, the time domain resource sequence number, or the cell identity; and
the sending, by the terminal device, of the N complex symbol groups comprises:
sending, by the terminal device, a signal obtained after the N complex symbol groups are scrambling-processed.

6. The method according to claim 2, wherein before the sending, by the terminal device, of the N complex symbol groups, the method further comprises:
performing, by the terminal device, interleaving processing on the N complex symbol groups, wherein an interleaving pattern used during the interleaving processing is determined based on at least one of the first parameter, the time domain resource sequence number, or the cell identity; and
the sending, by the terminal device, of the N complex symbol groups comprises:
sending, by the terminal device, a signal obtained after the N complex symbol groups are interleaving-processed.

7. A data modulation apparatus, comprising:
a processor; and
a memory having computer readable instructions stored thereon that, when executed by the processor, cause the apparatus to:
divide to-be-sent data into N bit groups, wherein N≥2 and N is an integer;
generate N complex symbol groups, wherein
an $i^{th}$ complex symbol group is obtained by processing an $i^{th}$ bit group based on a mapping rule corresponding to the $i^{th}$ bit group,
the mapping rule corresponding to the $i^{th}$ bit group is determined based on at least a group identity of the $i^{th}$ bit group and a first parameter,
the first parameter comprises a hopping offset,
the N bit groups correspond to at least two different mapping rules,
$0 \leq i \leq N-1$, and
i is an integer; and
send the N complex symbol groups.

8. The apparatus according to claim 7, wherein
the mapping rule corresponding to the $i^{th}$ bit group is determined based on the group identity of the $i^{th}$ bit group, the first parameter, and a second parameter, and
the second parameter comprises at least one of a cell identity, a time domain resource sequence number, or a periodicity P.

9. The apparatus according to claim 7, wherein when the to-be-sent data is retransmitted, mapping rules corresponding to the N bit groups during each transmission are respectively the same as mapping rules corresponding to the N bit groups during an initial transmission.

10. The apparatus according to claim 7, wherein the first parameter further comprises a radio network temporary identity (RNTI), a radio resource control (RRC) identity, or a temporary mobile subscriber identity (TMSI).

11. The apparatus according to claim 8, wherein the apparatus is further caused to:
perform scrambling processing on the N complex symbol groups before the sending unit sends the N complex symbol groups, wherein a scrambling sequence used during the scrambling processing is determined based on at least one of the first parameter, the time domain resource sequence number, or the cell identity; and
send a signal obtained after the N complex symbol groups are scrambling-processed.

12. The apparatus according to claim 8, wherein the apparatus is further caused to:
perform interleaving processing on the N complex symbol groups before the sending unit sends the N complex symbol groups, wherein an interleaving pattern used during the interleaving processing is determined based on at least one of the first parameter, the time domain resource sequence number, or the cell identity; and
send a signal obtained after the N complex symbol groups are interleaving-processed.

13. A data modulation method, comprising:
dividing, by a terminal device, to-be-sent data into N bit groups, wherein N≥2 and N is an integer;
generating, by the terminal device, N complex symbol groups, wherein
an $i^{th}$ complex symbol group is obtained by processing an $i^{th}$ bit group based on a mapping rule corresponding to the $i^{th}$ bit group,
the mapping rule corresponding to the $i^{th}$ bit group is determined based on at least a group identity of the $i^{th}$ bit group and a first parameter, the first parameter comprises at least one of a pilot parameter, a hopping identity, a terminal device identity, a layer index of a non-orthogonal layer, or a hopping offset, the N bit groups correspond to at least two different mapping rules, $0 \leq i \leq N-1$, and i is an integer;

performing, by the terminal device, scrambling processing on the N complex symbol groups based on a scrambling sequence, the scrambling sequence being based on the first parameter; and sending, by the terminal device, the N complex symbol groups by way of a signal obtained after the N complex symbol groups are scrambling-processed.

14. The method according to claim 13, wherein the mapping rule corresponding to the $i^{th}$ bit group is determined based on the group identity of the $i^{th}$ bit group, the first parameter, and a second parameter, and the second parameter comprises at least one of a cell identity, a time domain resource sequence number, or a periodicity P.

15. The method according to claim 13, wherein when the terminal device retransmits the to-be-sent data, mapping rules corresponding to the N bit groups during each transmission are respectively the same as mapping rules corresponding to the N bit groups during an initial transmission.

16. The method according to claim 13, wherein the terminal device identity is a radio network temporary identity (RNTI), a radio resource control (RRC) identity, or a temporary mobile subscriber identity (TMSI).

17. The method according to claim 1, wherein before the sending, by the terminal device, of the N complex symbol groups, the method further comprises:

performing, by the terminal device, interleaving processing on the N complex symbol groups based on an interleaving pattern used during the interleaving processing, the interleaving pattern being based on the first parameter; and the sending, by the terminal device, of the N complex symbol groups comprises:

sending, by the terminal device, a signal obtained after the N complex symbol groups are interleaving-processed.

18. The method according to claim 1, wherein the first parameter comprises the hopping offset and at least one of a pilot parameter, a hopping identity, a terminal device identity, or a layer index of a non-orthogonal layer.

19. The apparatus according to claim 8, wherein the apparatus is further caused to:

perform scrambling processing on the N complex symbol groups before the sending unit sends the N complex symbol groups based on a scrambling sequence, the scrambling sequence being based on the first parameter; and send a signal obtained after the N complex symbol groups are scrambling-processed.

20. The apparatus according to claim 8, wherein the apparatus is further caused to:

perform interleaving processing on the N complex symbol groups before the sending unit sends the N complex symbol groups based on an interleaving pattern, the interleaving pattern being based on the first parameter; and send a signal obtained after the N complex symbol groups are interleaving-processed.

* * * * *